(12) United States Patent
Baughman et al.

(10) Patent No.: US 11,481,401 B2
(45) Date of Patent: Oct. 25, 2022

(54) ENHANCED COGNITIVE QUERY CONSTRUCTION

(71) Applicant: INTERNATIONAL BUSINESS MACHINES CORPORATION, Armonk, NY (US)

(72) Inventors: Aaron K. Baughman, Cary, NC (US); Indervir Singh Banipal, Austin, TX (US); Shikhar Kwatra, San Jose, CA (US); Victor Povar, Vancouver (CA)

(73) Assignee: International Business Machines Corporation, Armonk, NY (US)

(\*) Notice: Subject to any disclaimer, the term of this patent is extended or adjusted under 35 U.S.C. 154(b) by 0 days.

(21) Appl. No.: 17/104,068

(22) Filed: Nov. 25, 2020

(65) Prior Publication Data

US 2022/0164360 A1   May 26, 2022

(51) Int. Cl.
  *G06F 16/2457* (2019.01)
  *G06F 16/242* (2019.01)

(52) U.S. Cl.
  CPC ...... *G06F 16/24575* (2019.01); *G06F 16/243* (2019.01); *G06F 16/24578* (2019.01)

(58) Field of Classification Search
  CPC ............ G06F 16/24575; G06F 16/243; G06F 16/24578
  See application file for complete search history.

(56) References Cited

U.S. PATENT DOCUMENTS

| 10,354,011 B2 | 7/2019 | Nell et al. |
| 2011/0184740 A1* | 7/2011 | Gruenstein ............ G10L 15/30 704/275 |
| 2014/0003714 A1 | 1/2014 | Mei |
| 2015/0206329 A1 | 7/2015 | Devries |
| 2016/0195856 A1 | 7/2016 | Spero |
| 2017/0357637 A1 | 12/2017 | Nell |
| 2018/0068031 A1 | 3/2018 | Hewavitharana et al. |
| 2019/0019349 A1* | 1/2019 | Dolgov ................. G07C 5/008 |
| 2019/0355346 A1 | 11/2019 | Bellegarda |
| 2020/0184970 A1* | 6/2020 | Kawano ............ H04N 1/00244 |

(Continued)

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Jay A Morrison

(74) *Attorney, Agent, or Firm* — Robert R. Aragona

(57) ABSTRACT

An embodiment for cognitively enhancing a search query is provided. The embodiment may include receiving a voice query from a user. The embodiment may also include analyzing the voice query. The embodiment may further include identifying an object within a focus area of the user based on the voice query. The embodiment may also include determining whether the identification of the object is confident, and in response to determining the identification of the object is not confident, receiving feedback from the user. In response to determining the identification of the object is confident, the embodiment may further include generating a relationship between a word in the voice query and the identified object. The embodiment may also include delivering an enhanced response to the user based on the identified object and the received feedback.

20 Claims, 5 Drawing Sheets

(56) References Cited

U.S. PATENT DOCUMENTS

2020/0364765 A1* 11/2020 Doh .................... G06Q 30/0631
2021/0012113 A1*  1/2021 Petill ................... G06F 16/5866
2021/0027776 A1*  1/2021 Wodrich ................ G10L 15/22
2021/0049214 A1*  2/2021 Lee ..................... B25J 11/0005

OTHER PUBLICATIONS

Wikipedia, "Albert Mehrabian," [accessed Aug. 31, 2020], 4 pages, Retrieved from the Internet Khttps://en.wikipedia.org/wiki/Albert_Mehrabian>.

* cited by examiner

ENHANCED COGNITIVE QUERY CONSTRUCTION

BACKGROUND

The present invention relates generally to the field of computing, and more particularly to a system for cognitively enhancing a search query and delivering a response.

Cognitive computing relates to the field of technology platforms that simulate the human thought process in complex situations where answers may be ambiguous and uncertain. These technology platforms may combine machine learning, reasoning, natural language processing, speech, vision, and human computer interaction that mimic the functioning of the human brain. When a voice query is submitted by a user, a virtual assistant analyzes the voice query and responds to the user. In most cases, the virtual assistant expects a complete voice query from the user, such that the user may be provided with an optimal response. For example, the user may ask, "What is the capital of Italy?" In this instance, the answer delivered by the virtual assistant would definitively be "Rome."

SUMMARY

According to one embodiment, a method, computer system, and computer program product for cognitively enhancing a search query is provided. The embodiment may include receiving a voice query from a user. The embodiment may also include analyzing the voice query. The embodiment may further include identifying an object within a focus area of the user based on the voice query. The embodiment may also include determining whether the identification of the object is confident. In response to determining the identification of the object is not confident, feedback from the user may be received. In response to determining the identification of the object is confident, a relationship between a word in the voice query and the identified object may be generated. The embodiment may further include delivering an enhanced response to the user based on the identified object and the feedback received from the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
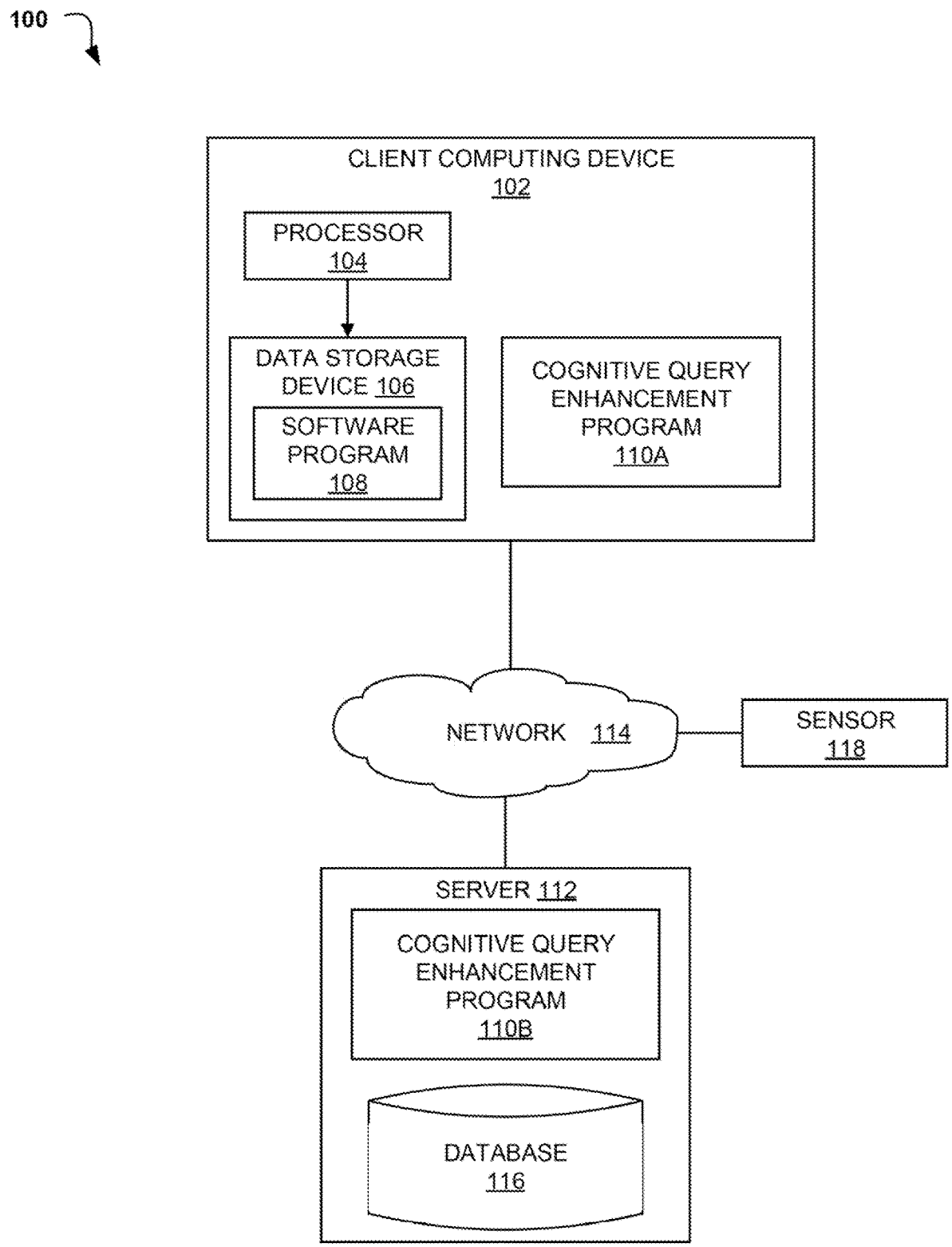
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a system for cognitively enhancing a search query and delivering a response. The following described exemplary embodiments provide a system, method, and program product to, among other things, analyze a voice query received from a user and, accordingly, construct a complete response to be delivered to the user. Therefore, the present embodiment has the capacity to improve the technical field of cognitively enhancing a search query by dynamically and more accurately analyzing the context of the voice query and correlating the voice query with a focus area of the user.

As previously described, cognitive computing relates to the field of technology platforms that simulate the human thought process in complex situations where answers may be ambiguous and uncertain. These technology platforms may combine machine learning, reasoning, natural language processing, speech, vision, and human computer interaction that mimic the functioning of the human brain. When a voice query is submitted by a user, a virtual assistant analyzes the voice query and responds to the user. In most cases, the virtual assistant expects a complete voice query from the user, such that the user may be provided with an optimal response. For example, the user may ask, "What is the capital of Italy?" In this instance, the answer delivered by the virtual assistant would definitively be "Rome." In many other situations, the user may focus in a particular direction and ask questions related to the user's focus area. However, research has concluded that humans communicate a majority of information non-verbally, such as through facial expressions, gestures, and body posture. Also, it may be difficult for a virtual assistant to interpret certain words coming from a user's voice due to different users having accents, speaking at different speeds, and mumbling words. This problem is typically addressed by obtaining a digital image of an object with a digital camera and matching a manipulatable portion of a virtual view of the digital image of the object with the voice query. However, obtaining a digital image of the object fails to dynamically analyze in real-time the context of the voice query and correlate the voice query with a focus area of the user. It may therefore be imperative to have a system in place to take a variety of contextual factors into account to identify an object in the user's focus area and enhance the voice query accordingly. Thus, embodiments of the present invention may provide advantages including, but not limited to, taking a variety of contextual factors into account to identify an object in the user's focus area, enhancing a voice query that may initially be difficult to interpret or incomplete with the identified object in the focus area, and receiving feedback from the user when confidence in the identified object is low.

According to at least one embodiment, the user may pose a voice query to be received by the system. The system may then analyze the voice query using natural language processing. Upon analyzing the voice query, the system may identify an object via a sensor, such as a camera, within a focus area of the user. The system may then determine a confidence in the identification of the object. In response to determining the identification of the object is not confident, the user may provide feedback to assist the system in properly identifying the object. In response to determining the identification of the object is confident, the system may generate a relationship between a word in the voice query and the identified object. Then, the system may deliver an enhanced response to the user based on the identified object as well as feedback received from the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to analyze a voice query received from a user and, accordingly, construct a complete response to be delivered to the user.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a cognitive query enhancement program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a cognitive query enhancement program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

A sensor 118 may be communicatively coupled to the communication network 114 to capture the user's contextual situation. For example, a camera may be used to capture a focus direction of the user's head. As another example, the sensor 118 may be an accelerometer and gyroscope that may detect whether the user is stationary or moving toward an object. In a further example, the sensor 118 may be a wearable device, such as a smartwatch, to detect motion of the user's hand. In yet another example, the sensor 118 may be a focus assist device, such as a head mounted display, a smart contact lens, and/or an external video recording device.

According to the present embodiment, the cognitive query enhancement program 110A, 110B may be a program capable of taking a variety of contextual factors into account to identify an object in the user's focus area, enhancing a voice query that may initially be difficult to interpret or incomplete with the identified object in the focus area, and receiving feedback from the user when confidence in the identified object is low. The cognitive query enhancement method is explained in further detail below with respect to FIG. 2.

Figure 2:
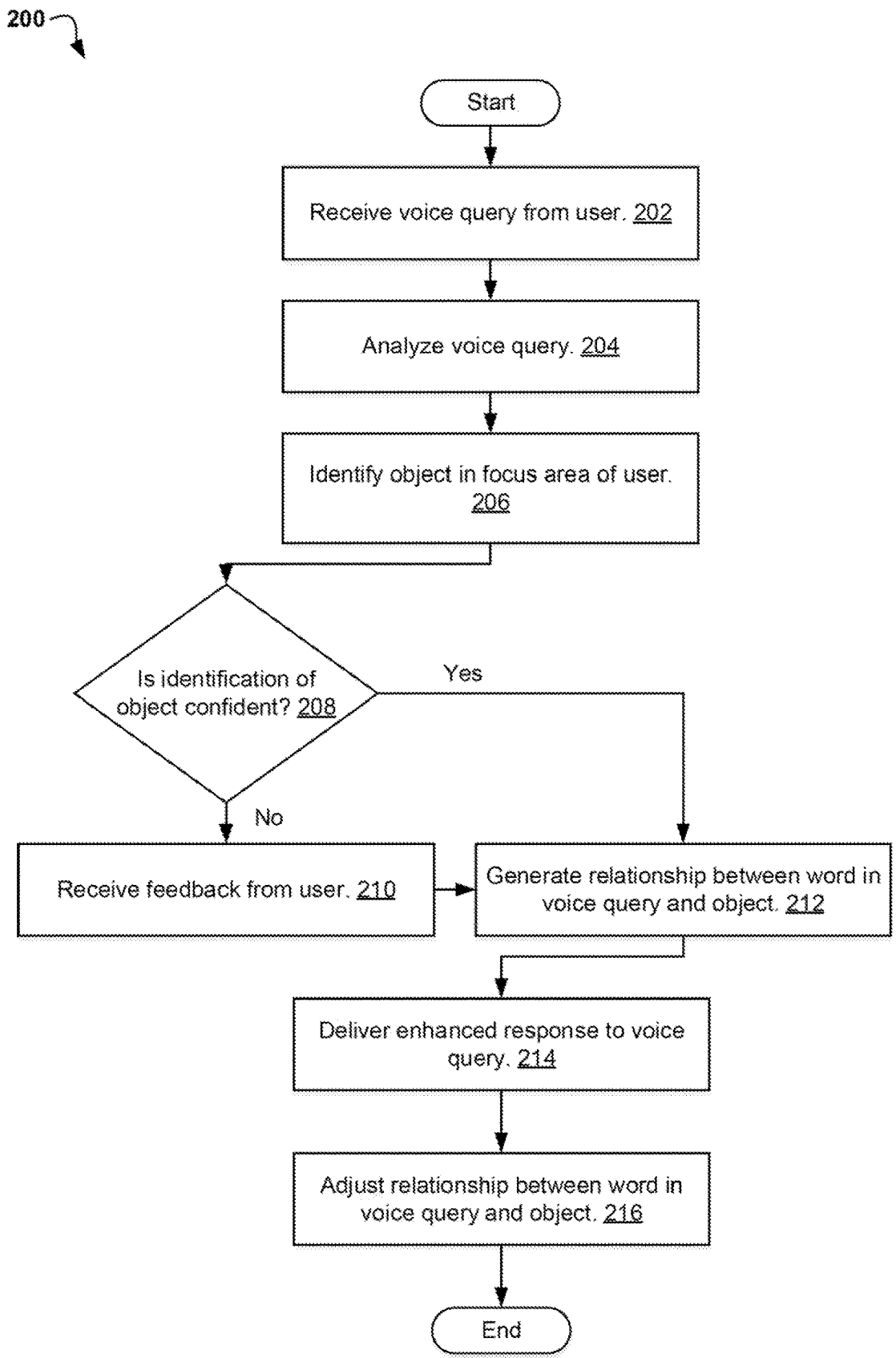
FIG. 2 illustrates an operational flowchart for cognitively enhancing a search query in a cognitive search query enhancement process according to at least one embodiment.

Referring now to FIG. 2, an operational flowchart for cognitively enhancing a search query in a cognitive search query enhancement process 200 is depicted according to at least one embodiment. At 202, the cognitive query enhancement program 110A, 110B receives the voice query. The voice query may be received from the user using a virtual assistant such as Google Home® (Google Home and all Google Home-based trademarks and logos are trademarks or registered trademarks of Google, LLC and/or its affiliates) and Alexa® (Alexa and all Alexa-based trademarks and logos are trademarks or registered trademarks of Amazon.com, Inc. and/or its affiliates). For example, the user may ask, "Alexa, what is the weather outside?" In this instance, the cognitive query enhancement system may recognize that a hot word is spoken. As used herein, "cognitive query enhancement system" refers to the interaction between the cognitive query enhancement program 110A, 110B, the virtual assistant, and peripheral devices such as the sensor 118. A "hot word" may simply be a word that activates the cognitive query enhancement system. The most common examples of a hot word may be "Alexa" and "Hey Google." Additionally, whenever a hot word is spoken, a microphone of the cognitive query enhancement system may not only listen for speech, but may also listen for sounds in the background. For example, the user may close a refrigerator door while the cognitive query enhancement system is activated, and the virtual assistant may prompt the user, "did you just close a refrigerator door?" If the user confirms that the sound is indeed the closing of a refrigerator door, the cognitive query enhancement system may actively learn by generating a relationship between the particular sound and the refrigerator door. Furthermore, a camera paired with the cognitive query enhancement system may be activated when the hot word is spoken to capture the user's surroundings. The camera may be integrated into the cognitive query enhancement system or the system can pair to external cameras, such as security system cameras.

Then, at 204, the cognitive query enhancement program 110A, 110B analyzes the voice query. The cognitive query enhancement system may utilize natural language processing (NLP) to analyze the voice query to identify the completeness of the voice query. Continuing the example above, the user may ask, "What is the weather outside?" In this instance, the voice query may be considered complete, i.e., the voice query has a confidence score of at least 70%, where the confidence score may be generated using known techniques. In other words, a confidence score of at least 70% means the cognitive query enhancement system may not need any further resources to deliver an accurate response. The cognitive query enhancement system may simply access the internet to obtain the weather information at a location where the user submitted the voice query. However, there may be certain scenarios where the voice query is incomplete, i.e., the voice query has a confidence score of less than 70%. For example, the user may ask, "Who wrote that book?" In this instance, the voice query may be too vague to deliver an accurate response. Words such as "this," "that," "it," "same," and "like," when used in the voice query, may be considered too vague to enable the cognitive query enhancement system to deliver an accurate response. If the voice query is incomplete, the cognitive query enhancement system may pair with a focus assist device and/or a wearable device, explained in further detail below in regard to step 206. A gesture of the user may be analyzed with information obtained from the wearable device. For example, the user's smartwatch may detect that the user is raising his arm at an angle of 90 degrees from the surface of the floor and 20 degrees to the right of where the user is standing. Continuing the example, when the information from the smartwatch is correlated with the camera, the cognitive query enhancement system may detect the user is pointing at a book on the left-most side of the third shelf of a bookshelf. A focus direction of the user may also be analyzed with information obtained from the camera and the focus assist device, also explained in further detail below in regard to step 206. For example, the focus assist device may detect the user's eyes are focused at an angle of 45 degrees to the right of where the user is standing.

Next, at 206, the cognitive query enhancement program 110A, 110B identifies the object within the focus area of the user. The object may be an intangible object, such as the weather, a movie, and a song, or a tangible object, such as one of the primary recognizable household objects for which the cognitive query enhancement system has the capability of understanding using computer vision techniques. An example of a tangible object may be a book, a refrigerator, and a television. Based on spoken content analysis, the cognitive query enhancement system may consider a focus area of the user. The focus area may also be a larger focus boundary. For example, the user may say, "Who wrote that book over there?" In such an instance, the cognitive query enhancement system may consider an entire corner of a room, since "over there" is a vague term. In another example, the user may say, "Who wrote that book on the bookshelf?" In this instance, the contents of the entire corner of the room may be unnecessary to take into account, as the focus area can be limited to just the contents of the bookshelf. As described above, the cognitive query enhancement system may be paired with a focus assist device and/or a wearable device. These devices may assist the cognitive query enhancement system in identifying the particular object to which the user is referring. The focus assist device may be a head mounted display, a smart contact lens, and/or an external video recording device. An example of an external video recording device may be a smartphone. As described above, the focus direction of the user may also be detected by utilizing these focus assist devices. Continuing the example above, the focus assist device, e.g., the smart contact lens, may detect the user's eyes are focused at an angle of 45 degrees to the right of where the user is standing. The focus of the user's head may be ascertained via the camera. As described above, user gestures may also assist in identifying the object. Information received from the focus assist device and/or the wearable device, the camera, as well as the voice query may be aggregated to identify the object to which the user is referring. Furthermore, known objects in the voice query may be used to identify unknown objects in the voice query without the use of the focus assist device and the wearable device. For example, the user may say, "What is the name of the movie playing on that TV in the kitchen?" In this instance, the "movie" may be the unknown object and the "TV in the kitchen" may be the known object. Continuing the example, any gesture of the user or focus assist device may not be needed to identify the movie playing, since the cognitive query enhancement system has sufficient information, i.e., the particular TV, such that camera alone may be used to identify the movie.

Then, at 208, the cognitive query enhancement program 110A, 110B determines whether the identification of the object is confident. As described above, the confidence threshold may be at least 70%, where a confidence score of 70% or greater indicates the cognitive query enhancement system may deliver an accurate answer to the user's voice query. If the cognitive query enhancement system determines the identification of the object is not confident, the cognitive search query enhancement process 200 may proceed to step 210 to receive feedback from the user. One or more confidence scores may be generated using known techniques in the following scenarios. If the cognitive query enhancement system determines the identification of the object is confident, the cognitive search query enhancement process 200 may proceed to step 212 to generate the relationship between the word in the voice query and the identified object.

As described above in regard to step 204, when the cognitive query enhancement system receives a voice query from the user, a confidence score of the voice query $\alpha_{ve}$ may be generated. The voice query may be from one of the primary languages for which the cognitive query enhancement system has the capacity to perform speech-to-text. The confidence of the voice query $\alpha_{ve}$ may be sent to a confidence resolution module.

When the user makes a gesture while wearing the wearable device, a confidence score of the gesture $\alpha_g$ may be generated. The gesture may be from one of the primary gestures for which the cognitive query enhancement system has the capacity to understand using computer vision techniques, including gestures such as raising their hand and/or pointing their finger. The confidence of the gesture command $\alpha_g$ may be sent to the confidence resolution module.

When the camera is activated by the hot word, a confidence score of the focus direction of the user $\alpha_{vn}$ may be generated. The focus direction of the user may be used by the cognitive query enhancement system to ascertain the object in the focus area. A low confidence score may result where the object in the focus area is not one of the primary recognizable household objects for which the cognitive query enhancement system has the capability of understanding using computer vision techniques. Additionally, a low confidence score may result where there is an obstruction between the camera and the user such that the camera does not have a clear view of the user. For example, there may be a large plant between the user and the camera such that the camera does not have a clear view of the user's head. The confidence of the focus direction of the user $\alpha_{vn}$ may be sent to the confidence resolution module.

When the cognitive query enhancement system receives the geolocation information of the user, a confidence score of the geolocation information $\alpha_{geo}$ may be generated. The geolocation information of the user, i.e., the current physical location of the user, may also be used by the cognitive query enhancement system to ascertain the object in the focus area. A low confidence score may result when the user is in an area with a poor internet connection or where the user is offline. The confidence of the geolocation information $\alpha_{geo}$ may be sent to the confidence resolution module.

The confidence resolution module may consider input from the above generated confidence scores. The confidence scores of the voice query, gesture, focus direction and geolocation information may each be considered to check which factors may be most useful in identifying the object. An average of two or more factors which add up to 70% or greater may also be deemed useful in identifying the object. For example, the gesture may be given a score of 40% confidence and the focus direction may be given a score of 30%. In this instance, the gesture and focus direction may be deemed useful in identifying the object, since they have a combined confidence score of at least 70%.

Next, at 210, the cognitive query enhancement program 110A, 110B receives feedback from the user. In situations where the voice query is ambiguous and the confidence in identifying the object is low, the cognitive query enhancement system may ask the user a question to confirm the object. For example, the user may ask "Where can I buy that?" In this instance, the cognitive query enhancement system may infer that the user is referring to a stereo system, but the inference is made with low confidence. The cognitive query enhancement system may ask the user, "Are you referring to the stereo system on your desk?" If the user responds with "no," the cognitive query enhancement system may ask another question to confirm the object. If the user responds with "yes," the cognitive search query enhancement process 200 may proceed to step 212 to generate the relationship between the word in the voice query and the identified object.

Then, at 212, the cognitive query enhancement program 110A, 110B generates the relationship between the word in the voice query and the identified object. If a similar voice query was previously asked by the user, the cognitive query enhancement system may learn the user's preferences and apply those preferences in responding to a future voice query. Continuing the example above, the user may ask, "Where can I buy that?" In this instance, the cognitive query enhancement system may associate "that" with "stereo system" and generate a relationship between the two words accordingly. Therefore, if the user asks "where can I buy that?" again in the future, and the user makes the same gesture, the focus assist device detects the same eye movements, and/or the camera detects the same focus direction, the cognitive query enhancement system may discern with high confidence that the user is referring to the stereo system. Thus, the cognitive query enhancement system may enhance the voice query by replacing a potentially vague word, such as "this" or "that," with the object to which the user is referring, such as the stereo system.

Next, at 214, the cognitive query enhancement program 110A, 110B delivers the enhanced response to the user. The enhanced response may be based on the identified object. Continuing the example above, where "that" was associated with "stereo system," the voice query may be enhanced by replacing the vague word "that" with the precise object "stereo system." Furthermore, the response of the virtual assistant may be correlated with the user's focus direction. For example, the user may ask, "What is the weather outside?" while the user is looking at a refrigerator. In addition to responding to the direct question about the weather, the virtual assistant may also recommend places nearby to buy a hot beverage if the temperature is below freezing. The user may in turn respond to the enhanced response in the form of feedback. For example, if the user responds with a "thank you," this response may serve as reinforcement that the answer to the voice query satisfied the user.

Then, at 216, the cognitive query enhancement program 110A, 110B adjusts the relationship between the word in the voice query and the identified object. The word in the voice query may be moved closer to the identified object in a word embedding model. A word embedding model may represent words in a sentence in the form of vectors and place words with similar meanings together in close spatial positions. For example, the user may ask, "What is the temperature in Seattle?" where the identified object is Seattle. The objective of this voice query may be for the user to learn the current temperature in Seattle. Each word in the sentence may be mapped to a vector. For example, since there are six words in the sentence above, mapping may be as follows: What [1,0,0,0,0,0]; is [0,1,0,0,0,0]; the [0,0,1,0,0,0]; temperature [0,0,0,1,0,0]; in [0,0,0,0,1,0]; Seattle [0,0,0,0,0,1]. Based on the objective in the above sentence, it may be desirable to adjust "temperature" so that it appears adjacent to "Seattle" in vector form. For example, the adjustment may be temperature [0,0,0,1,0,0] and Seattle [0,0,0,0,1,0].

It may be appreciated that FIG. 2 provides only an illustration of one implementation and does not imply any limitations with regard to how different embodiments may be implemented. Many modifications to the depicted environments may be made based on design and implementation requirements.

Figure 3:
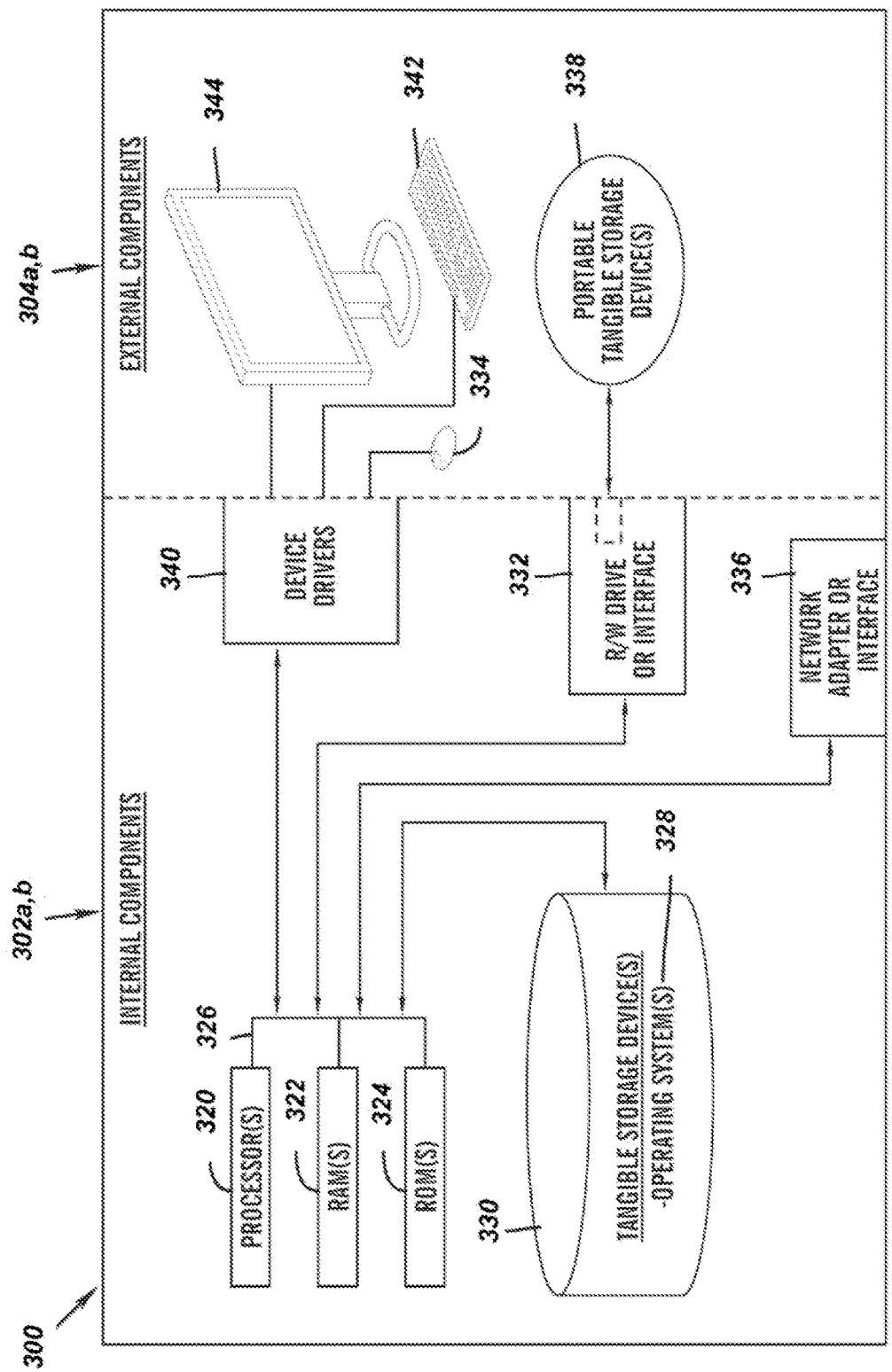
FIG. 3 is a functional block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the cognitive query enhancement program 110A in the client computing device 102 and the cognitive query enhancement program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive query enhancement program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The software program 108 and the cognitive query enhancement program 110A in the client computing device 102 and the cognitive query enhancement program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the cognitive query enhancement program 110A in the client computing device 102 and the cognitive query enhancement program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
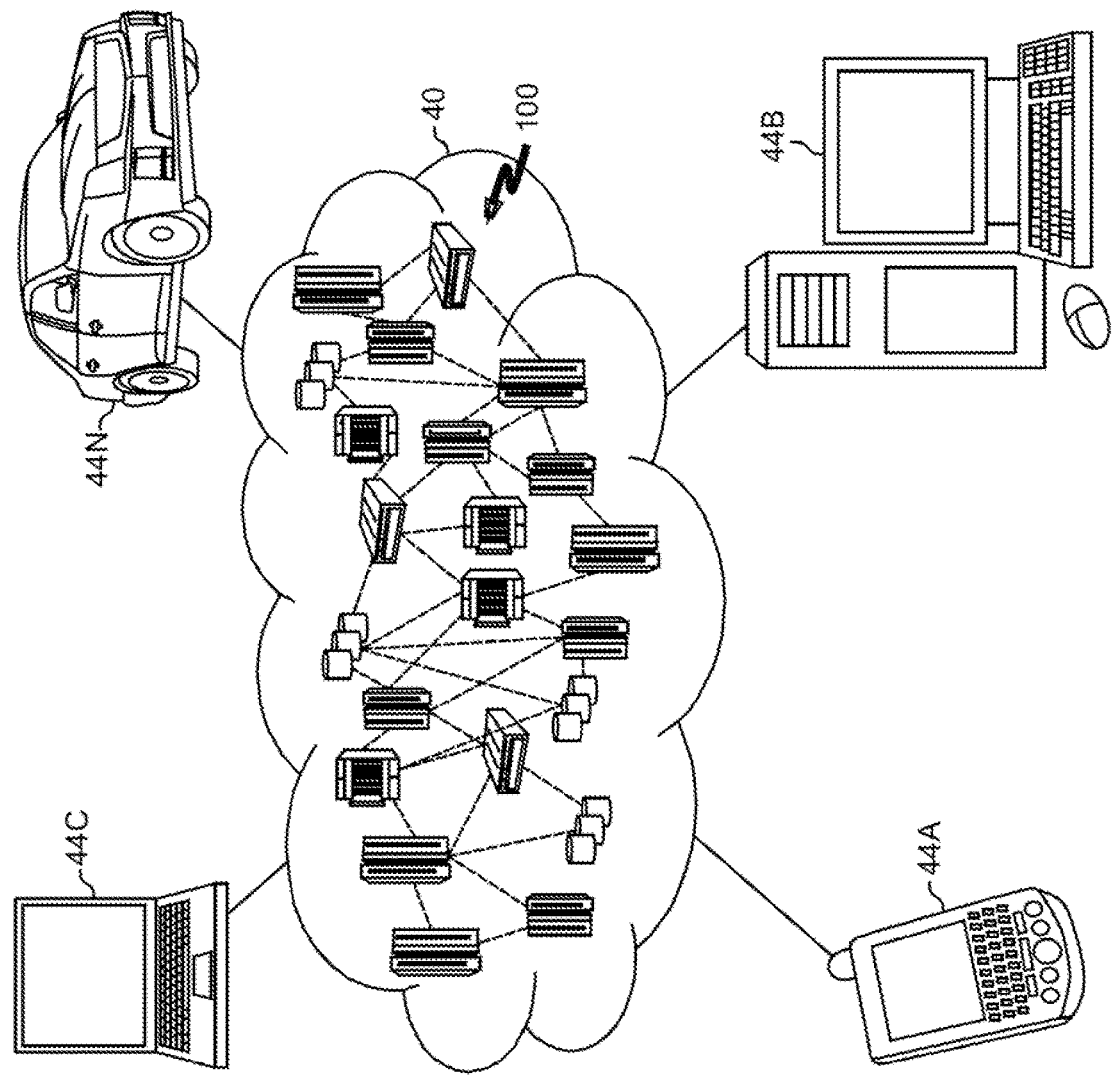
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
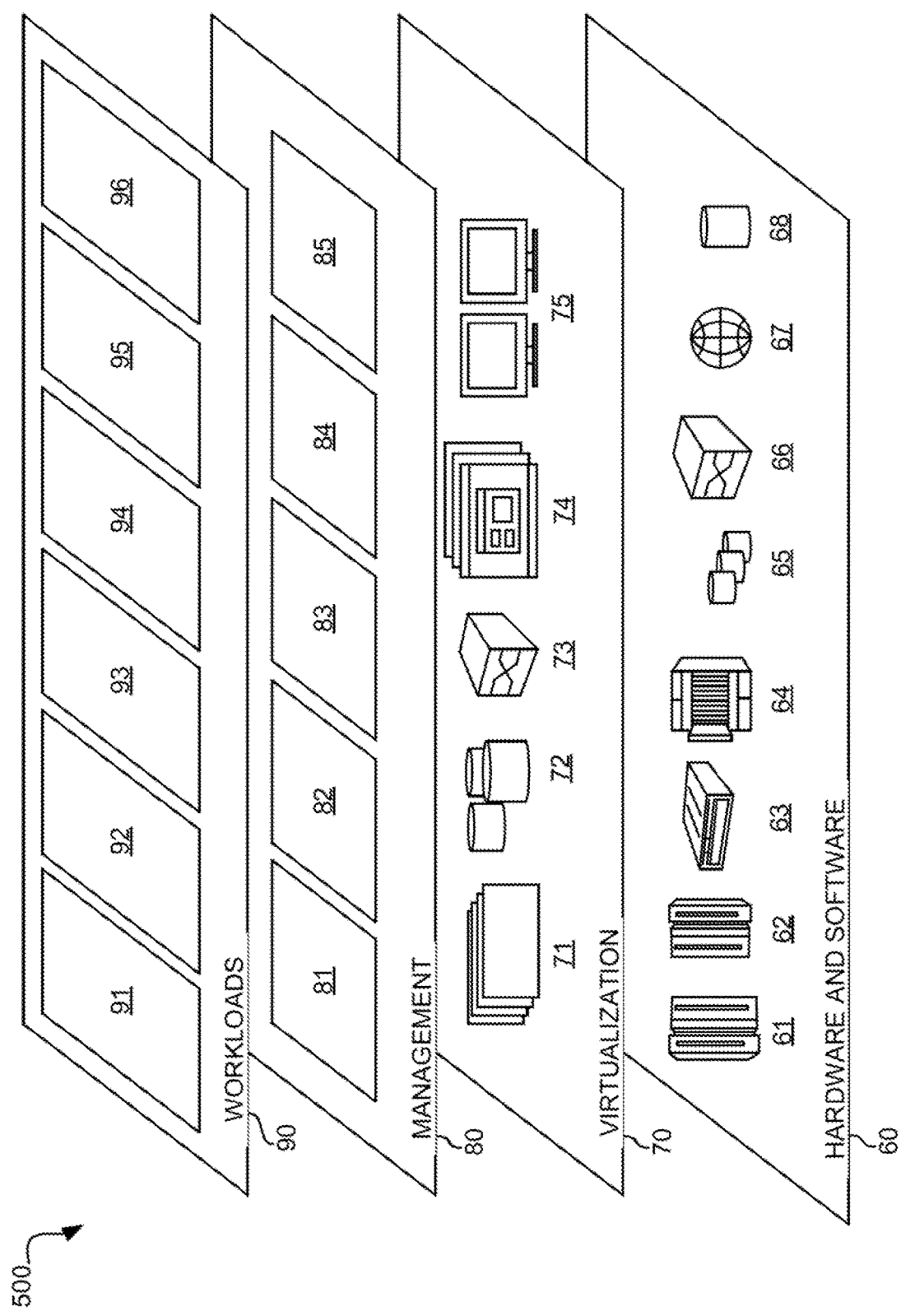
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enhanced cognitive query construction 96. Enhanced cognitive query construction 96 may relate to analyzing a voice query received from a user in order to construct a complete response to be delivered to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of cognitively enhancing a search query, the method comprising:
   receiving a voice query from a user;
   analyzing the voice query;
   identifying an object within a focus area of the user based on the voice query;
   determining whether the identification of the object is confident;
   in response to determining the identification of the object is not confident, receiving feedback from the user, wherein the received feedback from the user is verbal feedback from the user in response to an audio prompt from a virtual assistant asking the user to confirm the identification of the object; and
   delivering an enhanced response to the user based on the identified object and the received feedback, wherein the enhanced response includes a direct verbal response from the virtual assistant to the voice query followed by a verbal recommendation from the virtual assistant correlated with a focus direction of the user.

2. The method of claim 1, further comprising:
   in response to determining the identification of the object is confident, generating a relationship between a word in the voice query and the identified object.

3. The method of claim 1, wherein receiving the voice query from the user further comprises:
   activating a camera when a hot word is spoken by the user.

4. The method of claim 1, wherein analyzing the voice query further comprises:
   generating a confidence score for the voice query.

5. The method of claim 2, wherein generating the relationship between the word in the voice query and the identified object further comprises:
   receiving feedback from the user; and adjusting the relationship between the word in the voice query and the identified object by moving the word in the voice query closer to the identified object in a word embedding model.

6. The method of claim 1, wherein analyzing the voice query further comprises analyzing a gesture of the user or a focus direction of the user.

7. The method of claim 1, wherein identifying the object within the focus area further comprises connecting to a user focus assist device selected from a group consisting of a head mounted display, a smart contact lens, and an external video recording device.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a voice query from a user;
analyzing the voice query;
identifying an object within a focus area of the user based on the voice query;
determining whether the identification of the object is confident;
in response to determining the identification of the object is not confident, receiving feedback from the user, wherein the received feedback from the user is verbal feedback from the user in response to an audio prompt from a virtual assistant asking the user to confirm the identification of the object; and
delivering an enhanced response to the user based on the identified object and the received feedback, wherein the enhanced response includes a direct verbal response from the virtual assistant to the voice query followed by a verbal recommendation from the virtual assistant correlated with a focus direction of the user.

9. The computer system of claim 8, further comprising:
in response to determining the identification of the object is confident, generating a relationship between a word in the voice query and the identified object.

10. The computer system of claim 8, wherein receiving the voice query from the user further comprises:
activating a camera when a hot word is spoken by the user.

11. The computer system of claim 8, wherein analyzing the voice query further comprises:
generating a confidence score for the voice query.

12. The computer system of claim 9, wherein generating the relationship between the word in the voice query and the identified object further comprises:
receiving feedback from the user; and
adjusting the relationship between the word in the voice query and the identified object by moving the word in the voice query closer to the identified object in a word embedding model.

13. The computer system of claim 8, wherein analyzing the voice query further comprises analyzing a gesture of the user or a focus direction of the user.

14. The computer system of claim 8, wherein identifying the object within the focus area further comprises connecting to a user focus assist device selected from a group consisting of a head mounted display, a smart contact lens, and an external video recording device.

15. A computer program product, the computer program product comprising:
one or more computer-readable tangible storage medium and program instructions stored on at least one of the one or more tangible storage medium, the program instructions executable by a processor capable of performing a method, the method comprising:
receiving a voice query from a user;
analyzing the voice query;
identifying an object within a focus area of the user based on the voice query;
determining whether the identification of the object is confident;
in response to determining the identification of the object is not confident, receiving feedback from the user, wherein the received feedback from the user is verbal feedback from the user in response to an audio prompt from a virtual assistant asking the user to confirm the identification of the object; and
delivering an enhanced response to the user based on the identified object and the received feedback, wherein the enhanced response includes a direct verbal response from the virtual assistant to the voice query followed by a verbal recommendation from the virtual assistant correlated with a focus direction of the user.

16. The computer program product of claim 15, further comprising:
in response to determining the identification of the object is confident, generating a relationship between a word in the voice query and the identified object.

17. The computer program product of claim 15, wherein receiving the voice query from the user further comprises:
activating a camera when a hot word is spoken by the user.

18. The computer program product of claim 15, wherein analyzing the voice query further comprises:
generating a confidence score for the voice query.

19. The computer program product of claim 16, wherein generating the relationship between the word in the voice query and the identified object further comprises:
receiving feedback from the user; and
adjusting the relationship between the word in the voice query and the identified object by moving the word in the voice query closer to the identified object in a word embedding model.

20. The computer program product of claim 15, wherein analyzing the voice query further comprises analyzing a gesture of the user or a focus direction of the user.

* * * * *